(No Model.) 2 Sheets—Sheet 1.
C. R. BACHE.
HYDRAULIC WEIGHING SCALE FOR RAILWAY CARS.
No. 454,249. Patented June 16, 1891.
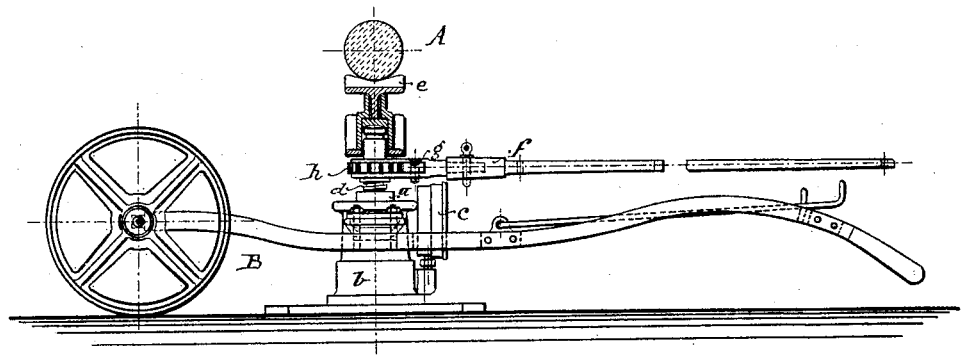
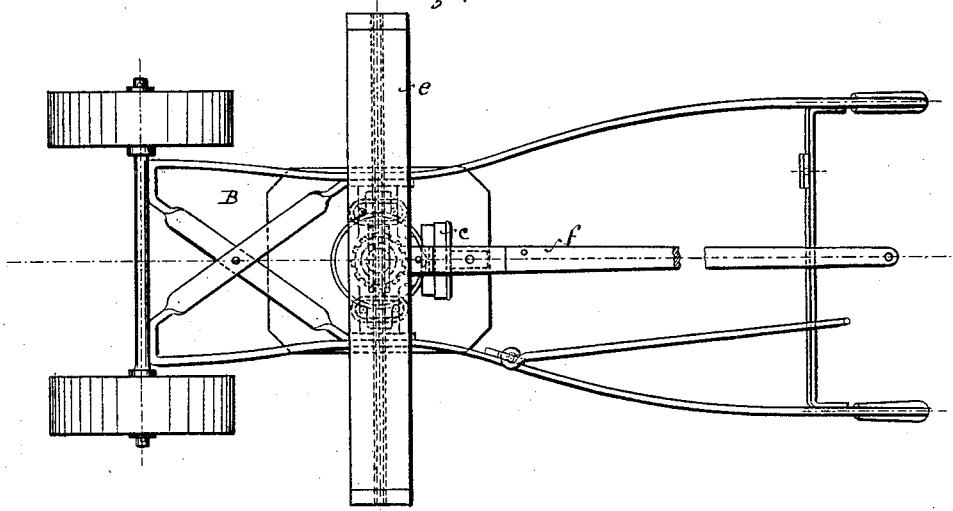
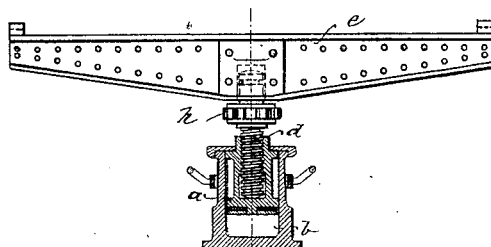

(No Model.) 2 Sheets—Sheet 2.

C. R. BACHE.
HYDRAULIC WEIGHING SCALE FOR RAILWAY CARS.

No. 454,249. Patented June 16, 1891.

Witnesses:
Henry Huber

Inventor
Carl Römer Bache
by Gorrell & Raegener
Attorneys.

UNITED STATES PATENT OFFICE.

CARL RÖMER BACHE, OF HOLSTEBRÖE, DENMARK.

HYDRAULIC WEIGHING-SCALE FOR RAILWAY-CARS.

SPECIFICATION forming part of Letters Patent No. 454,249, dated June 16, 1891.

Application filed November 6, 1890. Serial No. 370,557. (No model.) Patented in England May 26, 1888, No. 7,758.

*To all whom it may concern:*

Be it known that I, CARL RÖMER BACHE, a citizen of Denmark, residing at Holstebröe, in Denmark, have invented certain new and useful Improvements in Hydraulic Weighing-Scales for Railway-Cars, (for which I have obtained Letters Patent of Great Britain, No. 7,758, dated May 26, 1888;) and I do declare the following to be a full, clear, and exact description of the invention, such as will enable others skilled in the art to which it appertains to make and use the same.

This invention relates to an improved hydraulic scale for weighing railway-cars, which has the following characteristics: first, that the same is portable and can be readily placed under the car which is to be weighed, for which purpose the scale is mounted on a wheelbarrow-like structure, which can be readily moved from place to place by a single attendant; secondly, that the weight of the car, which is to be determined, is obtained in such a manner that the scale is first moved under one axle and then under the other axle of the car, upon which the latter is only lifted to such an extent that the wheels just clear the rails; third, the scales take up little room and can be readily placed in the space below the car or between two cable cars, so as to determine the weighing of one car from the other, and, fourth, the weighing of the car can be accomplished by a practiced attendant in about three minutes.

My improved weighing-scale for cars is based on the following principle of construction: The weight of the car is transmitted onto a piston, which is guided in a cylinder containing a suitable liquid, such as glycerine, the pressure of which is indicated on a suitable gage. When the car is raised sufficiently, so that the wheels are lifted clear of the rails, the index-hand of the gage stops and indicates the weight which presses on the wheels. In other words, one end of the car is weighed.

The invention consists in the construction and combination of parts and details, as will be fully described hereinafter, and finally be pointed out in the claims.

Figure 4:
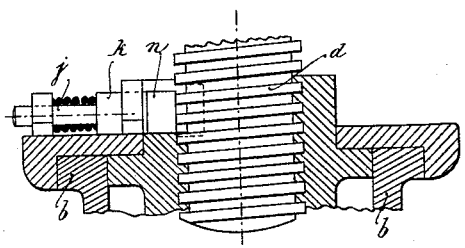
Figure 5:
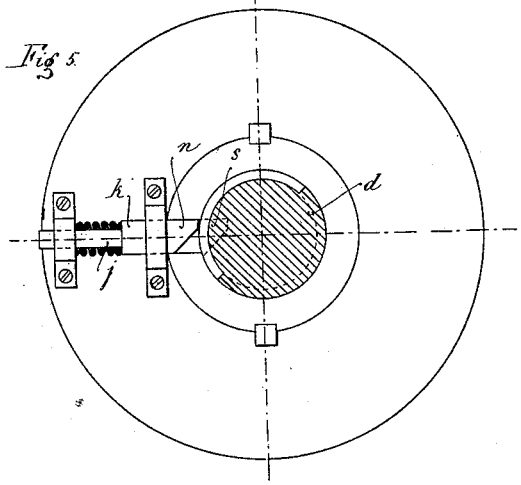
Figure 6:
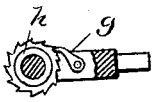

In the accompanying drawings, Figure 1 represents a side elevation, partly in section, of my improved portable hydraulic scale for weighing railway-cars. Fig. 2 is a plan of the same, and Fig. 3 is a vertical transverse section through the cylinder of the same. Figs. 4 and 5 are details of an automatic locking device on the same. Fig. 6 represents a plan of the ratchet mechanism on an enlarged scale.

Similar letters of reference indicate corresponding parts.

Referring to the drawings, $a$ represents a piston, which is guided in a cylinder $b$, and $c$ a gage, which is connected with the lower part of the cylinder, the cylinder containing a suitable liquid, such as glycerine. The body of the piston $a$ is made in the shape of a screw-nut into which the threaded piston-rod $d$ is screwed, to which rod the T-head or support $e$ for the car-axle A is swiveled. The T-shaped head $e$ can thereby be readily turned on the upper end of the threaded piston-rod $d$, and engages the axle when the piston-rod is raised by turning it on its axis in the piston $a$ by means of the oscillating lever $f$ and a pawl $g$, engaging the ratchet-wheel $h$ on the piston-rod $d$, as shown in Figs. 1 and 2. By continuing the operation of the pawl-and-ratchet mechanisms described, the weight of the car is finally transferred onto the piston $a$. The pressure-gage is to register up to twenty tons, the smallest subdivision indicating two hundred pounds, while the position of the index-hand between the two adjacent lines of the scale can be readily estimated up to fifty, one hundred, or one hundred and fifty pounds, so that the weight of a railway-car can be obtained within one hundred pounds, more or less.

The weighing-scale is mounted on a wheel-barrow or truck-like structure B, as shown in Figs. 1 and 2. As the wheels of a railway-car are only so far lifted by the action of the scale that the contact of the wheels is interrupted, the weight of the whole car can be readily determined by weighing first one and then the other end of the same. The result of the two weighings represents the total weight of the car, including its contents, even if the freight is distributed unequally over the pairs of wheels, inasmuch as any slight error that may theoretically be produced by the lifting of the wheels from the rails is very small, in a practical sense. The piston-rod in the cylinder has not to be lifted higher than just sufficient to lift the wheels from the rails. If the same be screwed still higher, it may injure the scale and render the same entirely unfit for further use.

For the purpose of preventing the damaging and injuring of the scale the device shown in Figs. 4 and 5 is used, by which the scale is automatically locked and prevented from being lifted any farther. This automatic locking device consists in a bolt $k$, which is guided in keepers on the head of the cylinder $b$ in such a manner that the same can be moved in a direction radially to the threaded piston-rod $d$. A spiral spring $j$ is interposed between a shoulder of the square head of the bolt and one of the keepers. It presses the bolt toward the piston-rod. The tapering head $n$ of the bolt is pressed against the threaded piston-rod $d$ until the same is screwed up sufficiently, so that the bolt can enter into a recess $s$ in the same, whereby the further upward movement of the piston-rod is prevented. The recess $s$ is inclined at one side, so as to correspond to the inclined side of the head of the bolt-head $n$, whereby the bolt is readily made to clear the recess $s$ when the piston-rod is screwed in a downward direction.

Having thus described my invention, I claim as new and desire to secure by Letters Patent—

1. A hydraulic scale for weighing railway-cars, which comprises a liquid-receiving cylinder, a piston in the same, a threaded piston-rod engaging an interior nut of the piston, means for rotating the piston-rod, and a locking device for said piston-rod, which is called into action when the required degree of lifting action is obtained, substantially as set forth.

2. The combination, with a liquid-receiving cylinder, a piston in the same, a threaded piston-rod engaging an interior nut of said piston, said piston-rod being provided with a recess, of a spring-actuated bolt guided on the head of the cylinder and adapted to engage said piston-rod when the same is lifted sufficiently, the piston-rod being provided with a recess into which the head of the ball can pass, substantially as set forth.

In testimony whereof I affix my signature in presence of two witnesses.

CARL RÖMER BACHE.

Witnesses:
H. H. HOAG,
TH. PEDERSEN.